US010663944B2

(12) United States Patent
Chebroux et al.

(10) Patent No.: US 10,663,944 B2
(45) Date of Patent: May 26, 2020

(54) MACHINING SYSTEMS COMPRISING A MACHINING FACILITY AND CONTROL METHODS

(71) Applicant: MESSIER-BUGATTI-DOWTY, Velizy Villacoublay (FR)

(72) Inventors: Christophe Chebroux, Velizy Villacoublay (FR); Daniel Lallement, Velizy Villacoublay (FR); Olivier Coma, Montreuil (FR); Olivier Bellaton, Montreuil (FR); Olivier Gueneau, Montreuil (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 445 days.

(21) Appl. No.: 15/109,873

(22) PCT Filed: Jan. 6, 2015

(86) PCT No.: PCT/EP2015/050108
§ 371 (c)(1),
(2) Date: Jul. 6, 2016

(87) PCT Pub. No.: WO2015/101675
PCT Pub. Date: Jul. 9, 2015

(65) Prior Publication Data
US 2016/0327929 A1 Nov. 10, 2016

(30) Foreign Application Priority Data
Jan. 6, 2014 (FR) ...................................... 14 50052

(51) Int. Cl.
G05B 19/00 (2006.01)
G05B 19/27 (2006.01)
(Continued)

(52) U.S. Cl.
CPC ......... *G05B 19/27* (2013.01); *G05B 19/0415* (2013.01); *G05B 19/402* (2013.01);
(Continued)

(58) Field of Classification Search
None
See application file for complete search history.

(56) References Cited

U.S. PATENT DOCUMENTS

2008/0091394 A1* 4/2008 Hahn ................. G05B 19/4069
703/7
2010/0063616 A1 3/2010 Mori et al.
(Continued)

OTHER PUBLICATIONS

International Search Report for PCT/EP2015/050108 dated Apr. 8, 2015.

*Primary Examiner* — Paul B Yanchus, III
(74) *Attorney, Agent, or Firm* — Sughrue Mion, PLLC

(57) ABSTRACT

A machining system (10) comprising a machine comprising:
real tool (12);
actuators (14) for moving the real tool (12);
sensors (15) for generating positioning data (16) for the real tool (12);
a memory (17) for storing shape correction data (20) for the real tool (12); and
a physical controller (18) for executing a machining program (19) and for controlling the actuators (14) as a function of the shape correction data (20), so as to move the real tool (12) relative to the real blank (13).
On the basis of said data (22) representative of the positions of the real tool (12) and of the real blank (13), image display means (24) generate a reconstituted image (25) representative:
of the shape of the real blank (13); and
of the position of the real tool (12) at a given instant.

12 Claims, 8 Drawing Sheets

(51) Int. Cl.
*G05B 19/4069* (2006.01)
*G05B 19/04* (2006.01)
*G05B 19/402* (2006.01)
*G05B 19/4063* (2006.01)
*G05B 19/414* (2006.01)

(52) U.S. Cl.
CPC ..... *G05B 19/4063* (2013.01); *G05B 19/4069* (2013.01); *G05B 19/4147* (2013.01); *G05B 2219/39439* (2013.01)

(56) References Cited

U.S. PATENT DOCUMENTS

| | | |
|---|---|---|
| 2012/0265330 A1 | 10/2012 | Beck et al. |
| 2012/0290122 A1 | 11/2012 | Morfino et al. |
| 2013/0218322 A1* | 8/2013 | Carli .................. B23Q 17/2414 700/180 |

* cited by examiner

US 10,663,944 B2

MACHINING SYSTEMS COMPRISING A MACHINING FACILITY AND CONTROL METHODS

CROSS REFERENCE TO RELATED APPLICATIONS

This application is a National Stage of International Application No. PCT/EP2015/050108 filed Jan. 6, 2015, claiming priority based on French Patent Application No. 14 50052 filed Jan. 6, 2014, the contents of all of which are incorporated herein by reference in their entirety.

BACKGROUND OF THE INVENTION

The invention relates to the general field of machining systems comprising machining tools and control methods for such machining systems.

Patent document EP 1 548 529 discloses a machining system comprising a machining tool comprising:
- at least one real tool for machining a real part;
- a plurality of actuators arranged to cause said at least one real tool to move relative to a real blank for machining in order to form the real part;
- a plurality of sensors for generating positioning data representative of a current position of the real tool relative to a real machine reference frame;
- a memory storing shape correction data for the real tool; and
- a physical controller arranged to execute a machining program and to control the actuators in compliance with instructions contained in the machining program and as a function of at least some of the shape correction data for the real tool, so as to move said at least one real tool in the real machine reference frame relative to the real blank in such a manner as to machine the real blank in order to form the real part.

In that prior art document, a solution is proposed for monitoring the machining by using a camera that transmits images of the machining, which correspond to machining instructions being executed by the physical controller.

Because a large amount of material is projected during machining, the video image picked up by the camera is often degraded, making it difficult to observe the machining.

OBJECT OF THE INVENTION

An object of the present invention is to provide a machining system enabling the operator to observe the machining while minimizing the difficulties of observation that are associated with material being projected during machining, such as projections of swarf or of cooling fluid.

SUMMARY OF THE INVENTION

In order to satisfy the above-specified object, the invention proposes a machining system comprising a machining tool comprising:
- at least one real tool for machining a real part;
- a plurality of actuators arranged to cause said at least one real tool to move relative to a real blank for machining in order to form the real part;
- a plurality of sensors for generating positioning data representative of a current position of the real tool relative to a real machine reference frame;
- a memory storing shape correction data for the real tool; and
- a physical controller arranged to execute a machining program and to control the actuators in compliance with instructions contained in the machining program and as a function of at least some of the shape correction data for the real tool, so as to move said at least one real tool in the real machine reference frame relative to the real blank in such a manner as to machine the real blank in order to form the real part.

This machining system of the invention is essentially characterized in that operator information means are connected to the physical controller in order to receive data representative:
- of the current position of the real tool in the real reference frame; and
- of the current position of the real blank in the real reference frame.

The information means further include image display means and memory means for storing a succession of current positions of the real tool in the real reference frame, the image display means being arranged to generate and display at least one reconstituted image that is reconstituted on the basis of said data representative of the positions of the real tool and of the real blank in the real reference frame, the reconstituted image being representative:
- of the shape at a given instant of the real blank being machined; and
- of the position at the given instant of the real tool relative to the real blank.

By means of the invention, and using the positioning data generated by the sensors of the real machining tool, the operator information means generate a virtual image referred to as a "reconstituted" image, that is representative of the real machining at a given instant. This image is said to be a "reconstituted" image because it is created using data coming from real measurements made by the sensors during real machining. This reconstituted image enables the user to see what is really happening in the machining tool, e.g. on a screen, without it being necessary for that person to use a camera looking at the real blank. This visualization presents the advantage of being particularly clear for the operator since there is no risk of the image being degraded by projections of swarf or of cooling fluid. Preferably, the operator may select: a desired display mode for the displayed image; the viewpoint from which to generate the reconstituted image; and the colors and the contrasts for displaying the tool and the blank.

The invention improves operator safety since there is no need to penetrate inside the machining enclosure in order to observe the real blank and the position of the real tool relative to the real blank.

In a preferred embodiment, the machining system of the invention further comprises:
- a virtual controller connected to said physical controller by communications means between the controllers, the virtual controller being arranged to simulate the operation of the physical controller executing said machining program, the simulation taking account of said machining program and of the shape correction data for the tool that is also used by the physical controller while the physical controller is executing said machining program; and the operator information means are also connected to the virtual controller and they are arranged to transmit information to the operator, which information comes from the simulation by the virtual controller of the operation of the physical controller, said image display means also being arranged to use the information coming from the simulation to generate a "simulated" image that is distinct from the reconstituted image, the simulated image likewise being representative:
- of the shape at a given instant of the real blank being machined; and
- of the position at the given instant of the real tool relative to the real blank.

This preferred embodiment solves in part the difficulties in observing the real machining since the virtual controller makes it possible to simulate the machining of the real blank before the machining is actually carried out while using the same program as is to be executed by the physical controller and the same shape correction data for the real tool that is being used for machining. In this embodiment of the invention, the operator obtains information representative of the real machining, either before it actually takes place (in advance relative to the real machining), or else while it is actually taking place on the machining tool, with it being possible for the simulated image that is being displayed to be put into phase with the current real machining.

The operator information means may also include phasing means for adjusting the phase of the displayed simulated image as a function of the machining program instruction that is being executed by the physical controller. These phasing means are arranged so that the displayed simulated image is representative of a machining operation on the real blank that ought to be performed by the real tool in response to the physical controller executing an instruction that ought to be executed in the future by the physical controller.

For example, the phasing means may ensure that the simulated image that is displayed is several instructions or several instruction blocks in advance relative to the instructions being executed by the physical controller. Alternatively, the phasing means may be arranged so that the simulated image that is displayed corresponds to a machining instruction that ought to be executed a predetermined length of time after the display.

Ideally, the phasing means are adjustable via a manual control to enable the operator to select the time in advance or the number of instructions in advance between the simulated image that is being displayed and the operation/instruction of the program that is currently being executed by the physical controller.

Thus, the operator can view a forthcoming machining operation (i.e. an operation that has not yet been performed, for which the corresponding instruction has not yet been executed by the physical controller), and the operator can anticipate problems, if any, before they actually occur.

BRIEF DESCRIPTION OF THE DRAWINGS

The invention can be better understood in the light of the following detailed description given by way of non-limiting indication and with reference to the accompanying drawings, in which.

DETAILED DESCRIPTION OF THE INVENTION

Figure 1:
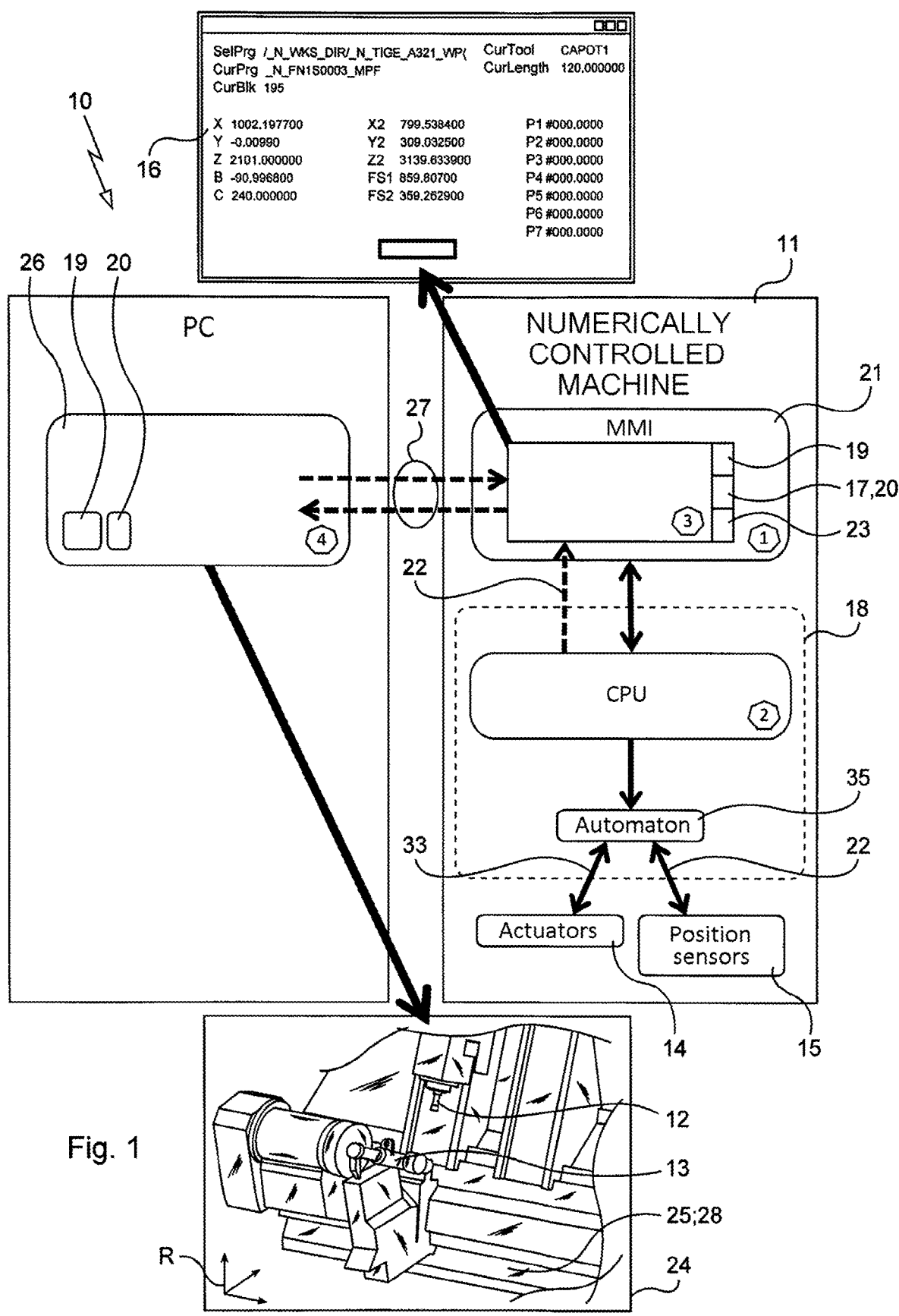
FIG. 1 is a general diagram of a machining system of the invention.

As mentioned above, it is sometimes difficult and/or impossible for the operator of a machining system to physically observe the real tool and the real blank during machining. Visibility of the real tool or of the real blank is often difficult because of the presence of protective systems, e.g. safety gates or casings placed between the real blank and the operator. During machining, visibility is also impeded by projected machining waste such as swarf or lubrication/cooling fluids.

The machining system 10 in accordance with the invention as described below solves this problem by providing the user with images 25, 28 that are representative of the real machining, enabling the user to detect risks of a machining defect before they occur.

As explained below, these images 25, 28 are mainly:
- so-called "simulated" images 28 generated by simulation performed by a virtual controller 26 simulating the operation of the physical controller 18 that controls the real movement of the real tool 12 relative to the real blank 13; and
- so-called "reconstituted" images that are generated while taking account of the real movements of the real tool 12 relative to the real blank 13 and of dimensional data for the tool, which data is referred to as tool shape correction data 20.

As shown in FIG. 1, the invention relates to a machining system 10 including a machining tool 11. This machining tool 11 comprises:
- at least one real tool 12 for machining a real part 13;
- a plurality of actuators 14 arranged to cause said at least one real tool 12 to move relative to a real blank 13 for machining in order to form the real part 13;
- a plurality of sensors 15 for generating positioning data 16 representative of a current position of the real tool 12 relative to a real machine reference frame R;
- a memory 17 storing shape correction data 20 for the real tool; and a physical controller 18 generating commands 33 for the actuators 14 as a function of instructions of a machining program 19 that it is executing.

The machining tool 11 presents a real structure/architecture having a plurality of linear movement axes X, Y, and Z for the tool relative to the machine reference frame R and at least one turning axis A for turning the tool 12 relative to the same machine reference frame 12. The machining tool 11 also presents a turning axis B for turning the real blank relative to the same reference frame. These axes X, Y, Z, A, and B are connected to various actuators for moving the real tool 12 along or about these axes relative to the real blank 13 as a function of commands 33 generated by the physical controller 18 executing a machining program 19.

When the physical controller 18 executes the machining program 19, it causes the tool 12 to move relative to the real blank 13 and it machines the blank 13 as a function of instructions of the program 19 and of shape correction data 20 for the tool 12 in use during the machining.

In order to obtain a real part 13 satisfying the expectations of the design department, the physical controller 18 acts during the execution of the program 19 to take account of the real shape of the real tool 12, and for this purpose it makes use of the shape correction data 20 for the tool 12. Each tool used by the machining tool 11 is associated with correction data 20 concerning the shape of the tool. The data 20 is generated by measurement means for measuring the tool 12, which means may either be external to the machining system 10 or else they may be incorporated in the machining system 10. By way of example, the measurement means operate by feeling the real tool or by optical measurement, in order to determine the real profile of the tool and/or in order to determine its real dimensions, such as its length or its diameter. It should be observed that each real tool 12 is associated with its own shape correction data 20.

Assuming that the theoretical tool in the machining program 19 is a straight bit having a length of 150 millimeters (mm) and a radius of 50 mm, and that the real tool 12 moved by the machining actuators 14 is a straight bit having a length of 160 mm and a radius of 51 mm, then the physical controller 18 executing the program 19 will cause the tool 12 to move in compliance with the instructions of the program 19 while taking account of the shape correction data 20 specifying the dimensions of the real tool 12. In this example, for any machining performed using the cutting edge situated at 51 mm from the axis of rotation of the tool, the physical controller 18 will cause the axis of rotation of the tool to back off by 1 mm more than is indicated in the corresponding instruction in the machining program 19. This correction is performed for each real tool 12 as a function of the shape correction data 20 that is representative of the real dimensions of the tool 12 and/or of the dimensional differences between the theoretical tool and the real tool 12.

The machining system 10 of the invention further includes operator information means 21 that are connected to the physical controller 18 in order to receive data 22 representative:
 of the current position of the real tool 12 in the real reference frame R; and
 of the current position of the real blank 13 in the real reference frame R.

The information means 21 further including image display means 24 and memory means 23 for storing a succession of current positions of the real tool 12 in the real reference frame R.

The image display means 24 are arranged to generate and display at least one reconstituted image 25 that is reconstituted on the basis of said data representative of the positions of the real tool 12 and of the real blank 13 in the real reference frame R.

This reconstituted image 25 is representative:
 of the shape at a given instant t1 of the real blank 13 being machined; and
 of the position at the given instant t1 of the real tool relative to the real blank.

The machining system 10 also includes a virtual controller 26 connected to said physical controller 18 by communications means 27 between these controllers 18 and 26.

The virtual controller 26 is simulation software executed by a real computer external to the machining tool 11 and distinct therefrom. The external computer may be incorporated in equipment external to the machining tool 11 and may be provided with man/machine interface means comprising a display screen that is also distinct from the machining tool 11.

The physical controller 18 forms part of the machining tool 11 and it is preferably arranged within a control cabinet forming part of the tool 11. The external controller 26 external to the machining tool 11 is consequently located outside the control cabinet. The communications means 27 between these physical and virtual controllers 18 and 26 comprise:
 a first network communications card arranged outside the control cabinet and connected to the external computer 26; and
 a second network communications card connected to a digital computer CPU of the physical controller 28; and
 communications devices between the first and second cards such as network cables and/or communications antennas.

Ideally, communication between these communications cards takes place using an Internet protocol (IP) network.

The physical controller 18 includes the digital computer CPU and an automaton 35. The digital computer CPU is arranged to execute the machining program 19 and to transmit instructions to the automaton 35 as a function of the execution of the machining program 19.

In turn, as a function of data transmitted by the sensors 15 and possibly by the actuators 14, the automaton 35 executes the instructions transmitted by the digital computer CPU and acts via commands 33 to cause the actuators 14 to move the tool 12 relative to the real blank 13 in order to reach a position for the tool relative to the blank as defined in the instructions.

The automaton 35 receives successive instructions defining a series of relative positions to be reached in succession in order to machine the real blank. The automaton 35 executes a control algorithm enabling it to select from among a plurality of possible paths the path that is to be followed for movement of the tool relative to the blank.

In this example, the virtual controller 26 is in the form of an algorithm running on a computer, specifically a personal computer (PC). The virtual controller 26 is arranged to simulate the operation of the physical controller 18 executing said machining program 19. This simulation needs to reproduce as accurately as possible the operation of the physical controller 18, i.e. of the CPU and of the automaton 35 for generating paths. This simulation takes account of the machining program 19 and the shape correction data 20 for the tool 12 likewise in use by the physical controller 18.

The operator information means 21 are likewise connected to the virtual controller 26 and they are arranged to transmit information to the operator that comes from the simulation performed by the virtual controller 26 of the operation of the physical controller 18.

These image display means 24 use information from the simulation to generate a "simulated" image 28 that is distinct from the "reconstituted" image 25. The simulated image 28 is representative:

of the shape at a given instant of the real blank being machined; and of the position at the given instant of the real tool relative to the real blank.

Figure 2:
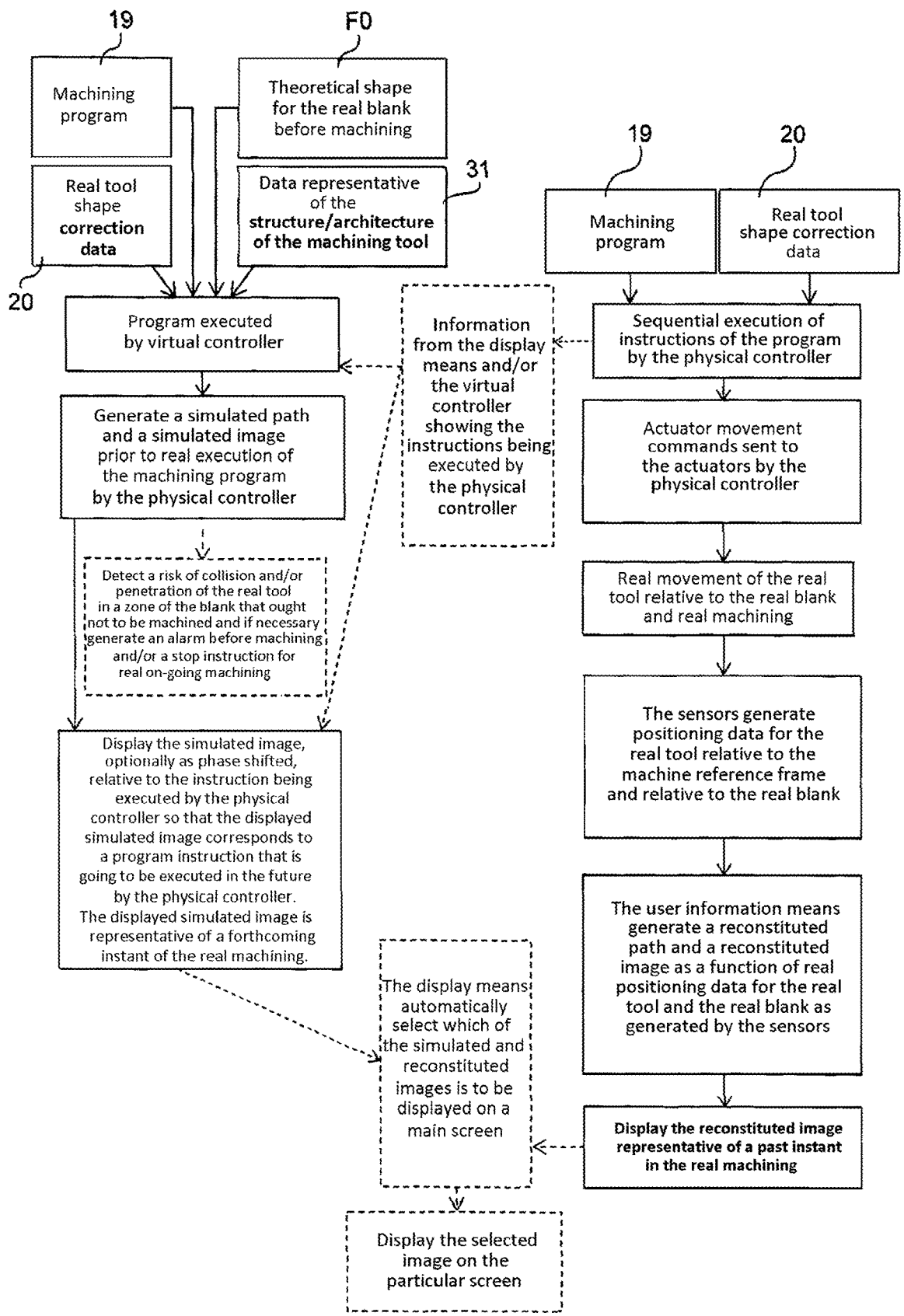
FIG. 2 is a diagram showing the operation of the machining system of the invention.

Ideally, in order to generate this simulated image 28, the display means 24 use predetermined data 31 representative of the structure of the machining tool. As can be seen in FIG. 2, this data 31 is used for the execution of the program 19 by the virtual controller 26.

Examples of reconstituted images 25 or simulated images 28 are shown in FIGS. 1, 3*b*, 5, 4, 6, 7, and 8, where there can be seen a representation of the machining tool with a machining head carrying the tool 12 that is movable along three axes X, Y, and Z in translation and in turning about a turning axis A. The part 13 is referred to as the "real blank" 13 so long as machining is ongoing. This part 13 is mounted to move with the help of a mandrel oriented along a turning axis B for turning relative to the reference frame R. The machining tool in this example is a five-axis machine. In this example, it should be observed that the tool 12 is a bit that is driven in rotation about its own axis of revolution in order to be capable of cutting away portions of the real blank 13 that lie on the real path of the tool.

In order to understand the invention, it should be observed that there is an essential difference between the simulated image 28 and the reconstituted image 25, which difference lies in the way in which these images are generated, both of which are representative of the machining.

For the reconstituted image 25, the image is generated on the basis of the real movements of the real tool 12 relative to the real blank 13 as measured by the sensors 15. For the simulated image, no account is taken of measured real movements of the real tool relative to the real blank, if any; however account is taken of the result of the virtual controller 26 executing the machining program 19 while also making use of the tool correction data 20 for the real tool 12.

Generating a Reconstituted Image or a Simulated Image

Figure 3A:
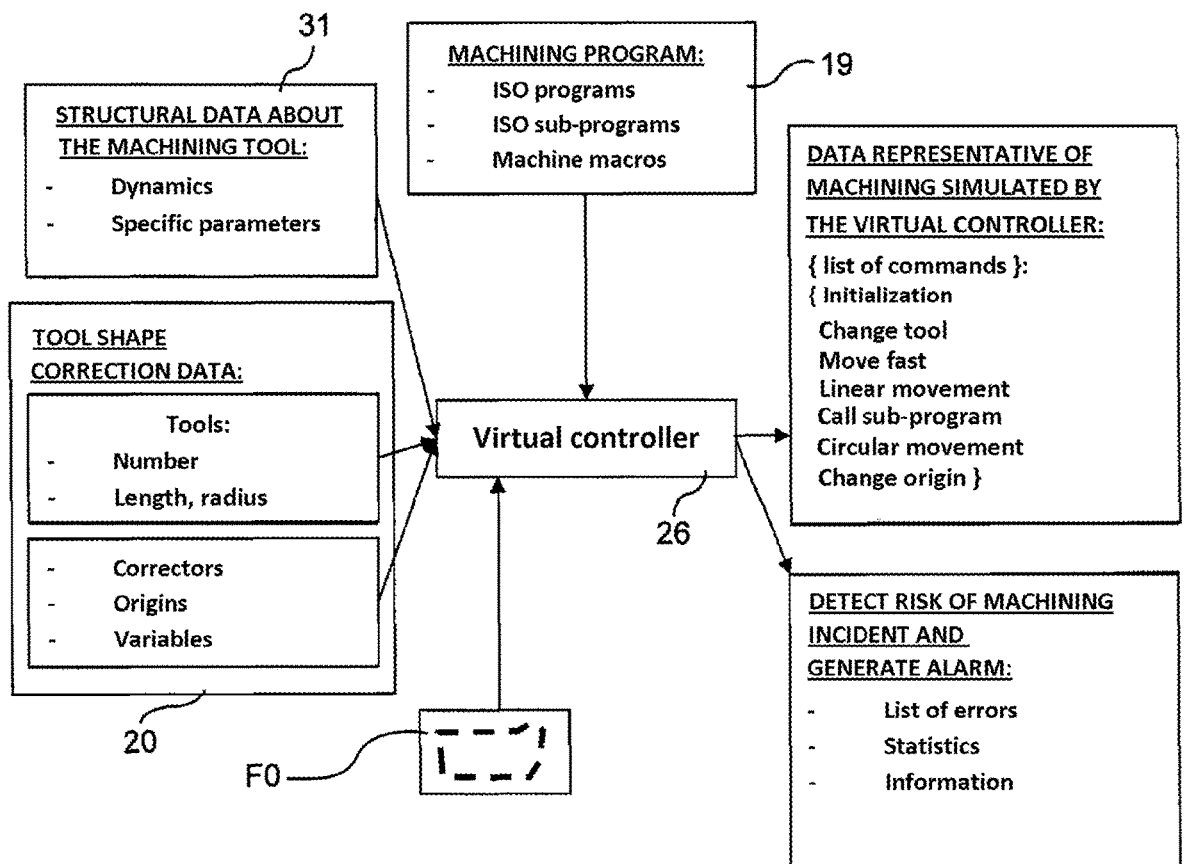
FIG. 3a is a functional view of a virtual controller used in the machining system of the invention.
Figure 3B:
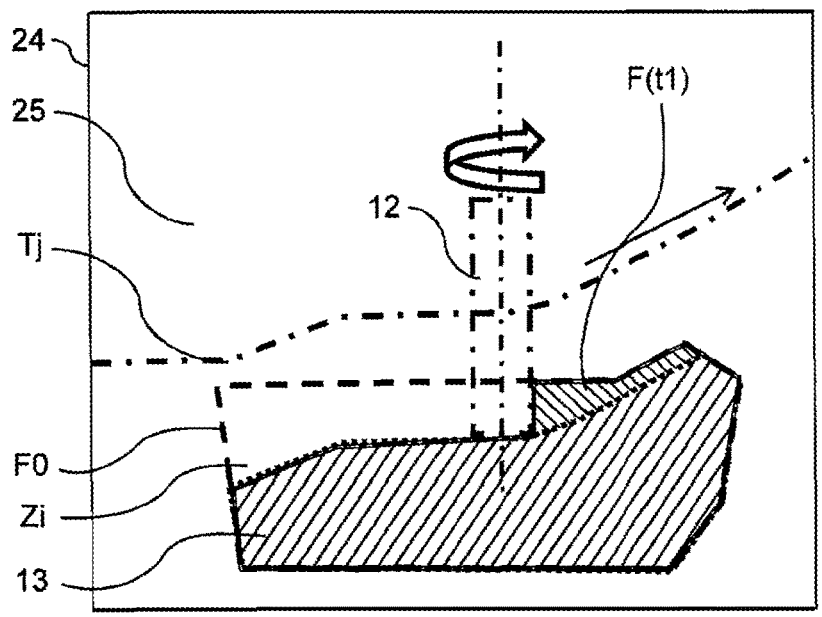
FIG. 3b is a diagrammatic view of a reconstituted image superposing shapes representative of a real blank before, after, and during machining using the theoretical path of the real tool.

As can be seen in particular in FIG. 3*b*, the reconstituted image 28 is generated by the display means 24 making use of:

a theoretical shape F0 for the blank 13 prior to machining, this theoretical shape being generated by the computer-aided manufacturing software and being representative of the real shape of the real blank 13 prior to machining;

a theoretical shape for the real tool 12 as determined at least from the shape correction data 20 of the tool 12 also used by the physical controller 18 during the execution of said machining program 19, the theoretical shape for the real tool 12 being representative at least in part of the real shape of the real tool 12; and a reconstituted theoretical path Tj representative of the movement of the real tool 12 relative to the real blank 13. This reconstituted theoretical path Tj is calculated using said succession of current positions for the real tool 12 in the real reference frame R as determined from the positioning data generated by the sensors 15.

More precisely, as shown diagrammatically in FIG. 3*b*, the reconstituted image 25 is generated by the display means 24:

by determining zones of the theoretical shape F0 for the blank 13 prior to machining that, up to this given instant t1 of the machining, have been found to lie on the reconstituted theoretical path Tj for the movement of the real tool 12, these zones being referred to as intersection zones Zi; and by subtracting all of these intersection zones Zi from the theoretical shape F0 for the blank prior to machining, so that the reconstituted image 25 as generated in this way is representative of the shape of the real blank 13 at the given instant t1 of the machining.

By means of the invention, the operator can view on a single image 25, referred to as the reconstituted image:

a representation of the real blank 13 being machined; and a representation of the theoretical shape for the real tool 12 in the theoretical position it ought to have been occupying relative to the real blank 13 at a given past instant t1 of the machining; and optionally the shape for the theoretical part as expected at the end of machining and/or the theoretical shape F0 for the blank before machining.

Since this view 25 is generated using real positioning data supplied by the sensors 15 of the machining tool 11, it is necessarily late relative to the real machining that is ongoing or that has already taken place.

This delay is associated with the time needed for the sensors 15 to transmit the position data and the time needed for the display means 24 to display the tool 12 and the blank 13 as they were respectively positioned in the machine reference frame R at the time when the sensors 15 were detecting those respective positions. In practice, this delay time remains acceptable since it can be relatively short. The reconstituted image 25 enables the operator to have a relatively accurate representation approximating the machining operation as it really took place.

Ideally, the means 24 for displaying the reconstituted or simulated image are arranged to generate a visual animation representative of at least a portion of the machining and the displayed image is extracted from the animation.

In order to enable the operator to browse easily through the animation generated by the display means, the system may include selection means for selecting a viewpoint that is used for generating the displayed image. By using the selection means, the operator can select the type of representation that is to be used for generating the displayed image, from among:

a perspective representation; and/or a section representation on a section plane selected by the operator; and/or a representation comprising an image of the real tool in position relative to the real blank being machined; and/or a representation comprising an image of the real tool positioned relative to the real blank being machined and relative to a machine environment around the tool 12 and the blank 13.

Still for the purpose of improving ergonomics, the system may include means for enabling the operator to select the given instant t1 of the real machining for which the operator seeks to obtain a reconstituted image 25 or a simulated image 28 representative of that machining at that given instant t1.

In response to the operator selecting the given machining instant t1 for display, the display means generate a reconstituted image 25 representative of the real machining as it was at the selected given instant.

The operator can thus act as often as desired to view how past machining took place. This makes it possible in particular to determine the reasons why a machined part 13 presents some particular shape or some particular defect. It is then possible, a posteriori, to identify the instruction in the machining program 19 that was being executed and that is responsible for this particular defect. The machining program 19 and/or the real tool 12 can then be modified in order to avoid the defect occurring again during a subsequent machining operation.

Compared with the simulated image, the reconstituted image 25 presents the advantage of being more representative of real machining since it takes account of the positions as really measured by the sensors 15 and the tool shape corrections 20 as really used by the physical controller. This accuracy is due essentially to the difference that exists between an instruction for moving the tool 12 along a path given in the program 19 and the real movement path of the tool 12 as executed by the machining tool 11. Since the real machining tool has a plurality of actuators 14 and of axes X, Y, Z, A, and B for controlling the movements of the real tool 12 relative to the real blank 13, the physical controller 18 executing an instruction of the machining program 19 needs to identify the combination of commands 33 to be given to the various actuators 14 in order to cause the real tool 12 to move along a real path that is as close as possible to the path specified by the instruction being executed of the program 19. The way in which each physical controller 18 selects this combination of commands 33 to be given to the actuators 14 varies from one physical controller 18 to another. Since a virtual controller 26 might not operate identically to the physical controller 18 that it simulates, it can be found that, for a given executed instruction, the virtual and physical controllers 26 and 18 generate respectively a simulated path and a real path that present a difference. This difference between paths is generally less than 0.1 mm between the paths and does not invalidate the simulation based on the virtual controller when it comes to detecting alerts by using a phase advance.

By generating the reconstituted path Tj and the reconstituted image 25, the invention gives a more accurate view of the path actually followed by the real tool than would be possible if only a path as simulated by the virtual controller were to be viewed.

Thus, in the invention, when preference is given to dimensional accuracy of the display, then it is a reconstituted image 25 that is selected for display rather than a simulated image 28.

Figure 6:
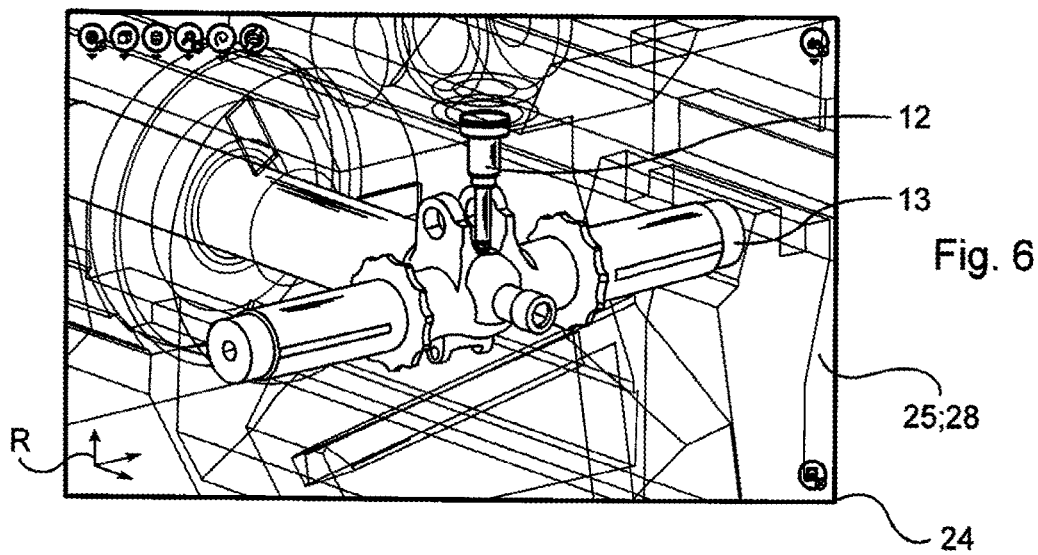

As can be seen in FIGS. 2 and 6, preference is given to displaying the reconstituted image 25 when the operator is manually controlling the movement of the real tool relative to the real blank, e.g. in order to disengage the real tool while avoiding as much as possible any collision between the tool and the real blank 13.

In order to understand the invention, the term "manual control" should be understood as meaning that the physical controller 18 has interrupted execution of the machining program 19 and that it then executes only instructions to move the real tool 12 relative to the real blank 13 as a function of manual commands issued by the operator acting on manual control means.

Figure 9:
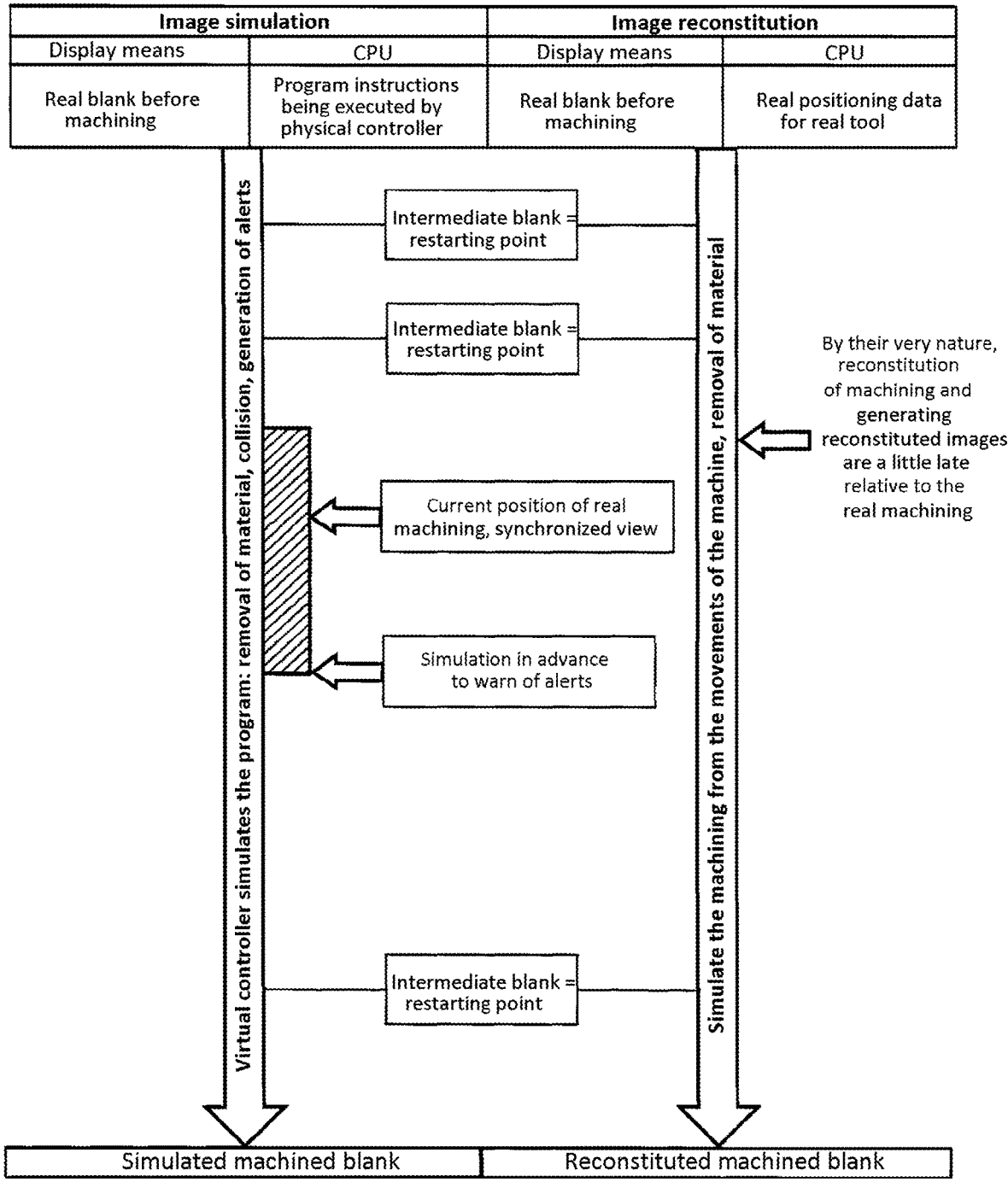
FIG. 9 shows how machining performed with the machining system of the invention takes place while the physical controller executes the machining program and controls the machining of the real blank with the real tool, the displayed image being an image simulated by the virtual controller and in phase with the machining instruction that is being executed by the physical controller.

A drawback of observing machining by using the reconstituted image 25 is that it must necessarily be viewed a posteriori, after there has been a real movement of the real tool 12 relative to the machine reference frame R and to the real blank 13. Such a posteriori viewing does not make it possible to anticipate what is going to happen during a forthcoming movement of the real tool relative to the real blank. This drawback is solved in part by using the simulated image 28 of the invention. As can be seen in FIGS. 2 and 9, this simulated image 28 is generated not on the basis of positioning data generated by the sensors 15, but on the basis of:

the machining program 19 being executed by the virtual controller 26; and shape correction data 20 for the real tool 12 that the physical controller 18 of the machining tool 11 is actually going to be using during its forthcoming execution of the machining program 19.

In order to generate this simulated image 28, the virtual controller 26 executes the instructions of the machining program 19 before they are executed by the physical controller 18.

By using the shape correction data 20 for the real tool 12 in this simulation it is possible to have a machining simulation immediately before the real machining and to take account of the real dimensional features of the tool 12. Thus, unlike a conventional machining simulation as performed by a computer-aided manufacturing (CAM) program, where it is the theoretical tool that is taken into account without taking account of shape corrections for the real tool 12, and without simulating the operation of the physical controller 18, it is possible to detect certain machining defects that would not otherwise be detected by the CAM program using a virtual tool of virtual shape that is necessarily different from the real shape of the real tool. For example, if the operator places a real tool 12 other than the tool that ought to be positioned in the machining tool 11, then a machining defect would be observed. Nevertheless, since the dimensions of the real tool 12 are taken into account by the virtual controller 26 for generating the simulated image, it becomes possible for the operator viewing the simulated image 28 to see that the forthcoming machining is going to present a defect relative to the expected machining. Thus, the user can predict machining defects before they actually happen.

In preferred implementations of the invention described with reference to FIGS. 2, 3a, and 10, it is possible to act automatically to detect risks of machining accidents and to generate alarms prior to machining by using the simulated path and the simulated images 28.

For this purpose, the system 10 of the invention may include means for generating an alarm in the event:

of the reconstituted path of the real tool penetrating into a predetermined limit zone extending around a virtual surface representative of the real part that it is desired to obtain at the end of machining; and/or of a machining incident being detected such as detecting breakage of the real tool, detecting abnormal vibration of an element of the machining system, detecting movement of the real tool outside a predetermined space authorized for presence of the real tool, and detecting opening of a safety gate of the machining tool; and/or of detecting an order to stop machining issued by the operator acting on a manual control.

If no alarm is detected while machining is taking place, the display means 24 display the simulated image 28 at a phase determined by phasing means for setting the displayed simulated image at a phase that is a function of the instruction of the program 19 that is being executed by the physical controller 18.

The information means are arranged to display the reconstituted image 25 in response to an alarm being generated during machining. The information means 21 also enable the operator to switch to a manual control mode in which the operator controls the actuators 15 so as to move the real tool relative to the real blank by using the manual control means. Such manual control means may comprise a joystick and/or control keys, and/or a touch screen. As can be seen in FIG. 10, the reconstituted image 25 that is displayed in the event of an alarm is preferably representative of:

the shape of the real blank 13 being machined at the instant when the operator manually controls the movement of the real tool; and the position of the real tool 12 relative to the real blank at the same instant.

Figure 10:
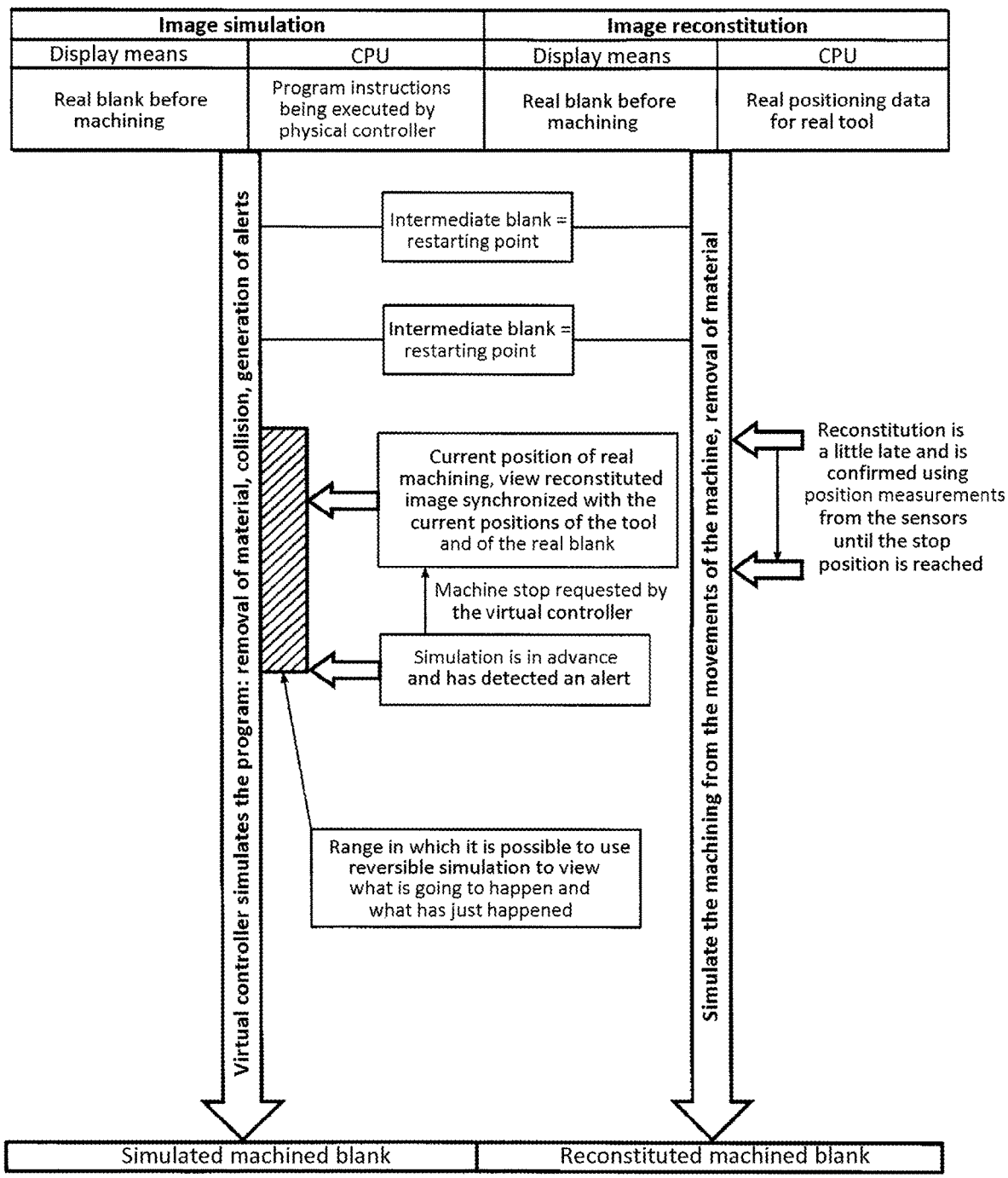
FIG. 10 shows how machining performed with the machining system of the invention takes place and in which, during real machining, the virtual controller simulating the real machining has generated an alert concerning a risk of a machining defect in the machined part and has issued an order to the physical controller to interrupt machining, the displayed image at this point being a reconstituted image.

As can be seen in FIG. 10, in the event of an alarm, the displayed image is a reconstituted image 25 synchronized with the current real machining, i.e. with the current relative positions between the tool and the blank as measured by the sensor 15.

Procedure for Restarting after Interrupting Machining

Figure 11:
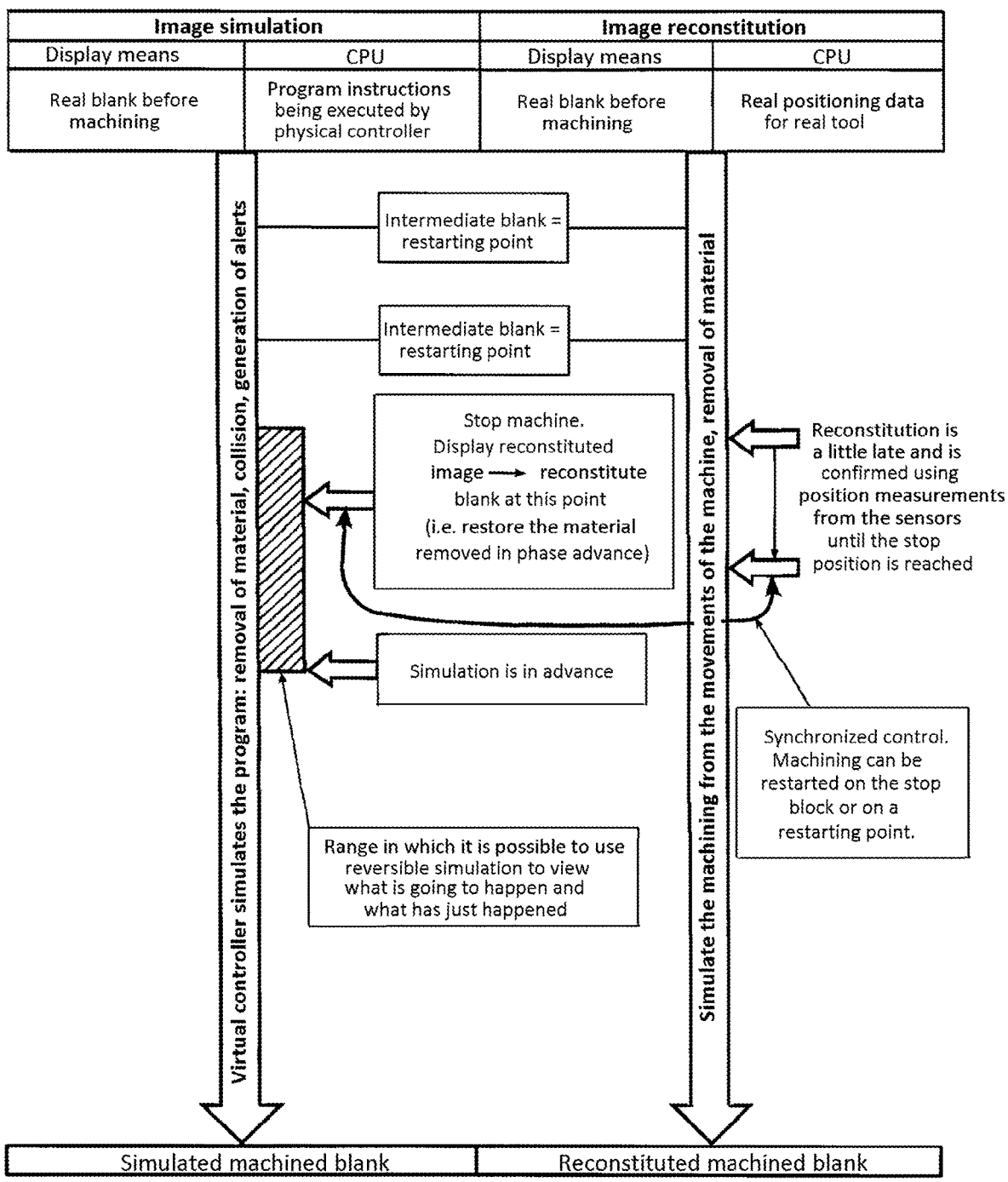
FIG. 11 shows how machining performed with the system of the invention takes place while the physical controller is moving the real tool as a function of instructions generated by a manual tool-movement control actuated by the operator, the image displayed for the operator at this point being a reconstituted image.

As shown with reference to FIGS. 9, 10, and 11, the machining program 19 includes markers specifying restarting points from which it is possible to position the real tool if it is desired to carry on machining after an interruption of machining. Generally, the restarting points imply positioning the real tool 12 at a distance from the real blank 13. Thus, as shown in FIGS. 2 and 11, in the event of real machining being interrupted, the machining tool 11 passes into manual control mode. The display means 24 then display on a particular screen of the display means 24 the reconstituted image 25 as generated from a viewpoint that may possibly be selected by the operator. The operator can then manually cause the real tool to be disengaged from the real blank while relying on the displayed reconstituted image 25. During manual control, the display means enable the operator to enlarge zones of the selected reconstituted image and/or to change the viewpoint and/or the section plane. The display means 24 enable the operator to select from a plurality of available reconstituted views the view preferred by the operator for visualizing a position of the real tool relative to the real blank at a given instant t1.

Figure 4:
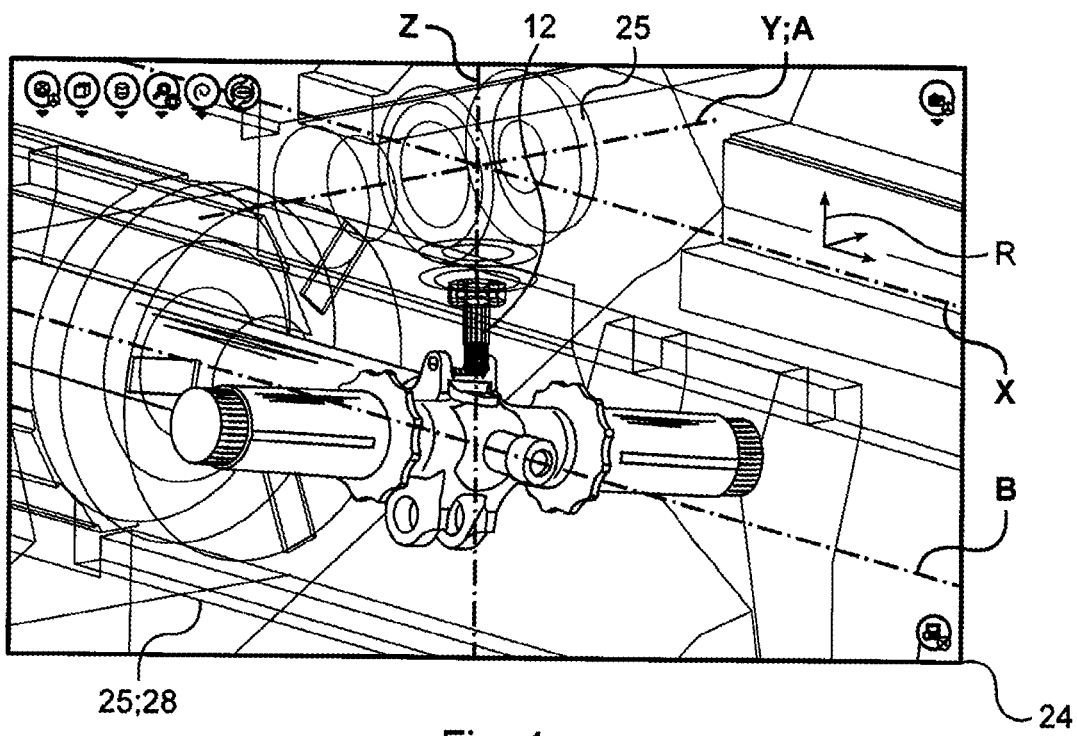
FIGS. 4 to 8 show reconstituted or simulated images as displayed in sequence by the display means of the machining system of the invention.
Figure 5:
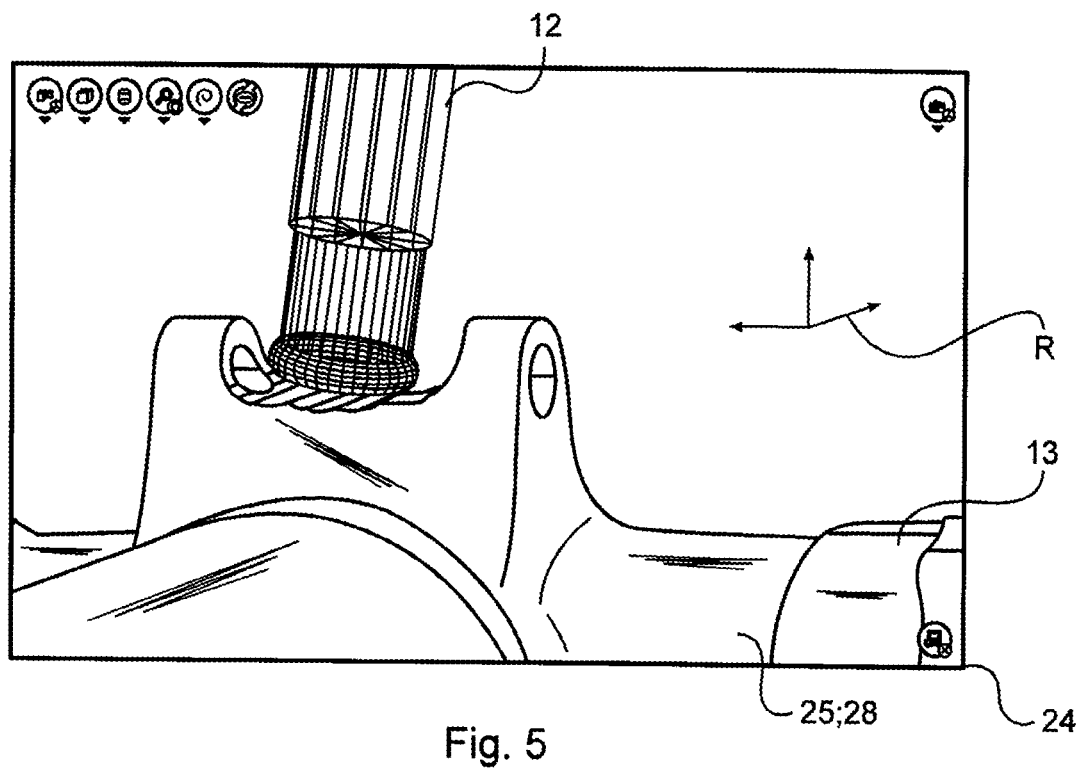

FIGS. 4 and 5 show two displayed images, each showing the real tool in the same position relative to the real blank. In the image of FIG. 4, the display means 24 are displaying a general view representative of the real tool 12, of the real blank 13, and of the machine environment (machining assemblies, the structure of the real machine, and the machine axes).

In FIG. 5, the display means are displaying an image centered around the zone of contact between the real tool 12 and the blank 13 being machined. In this figure, the machine environment can no longer be seen since it has voluntarily been eliminated from the image by user selection.

Figure 7:
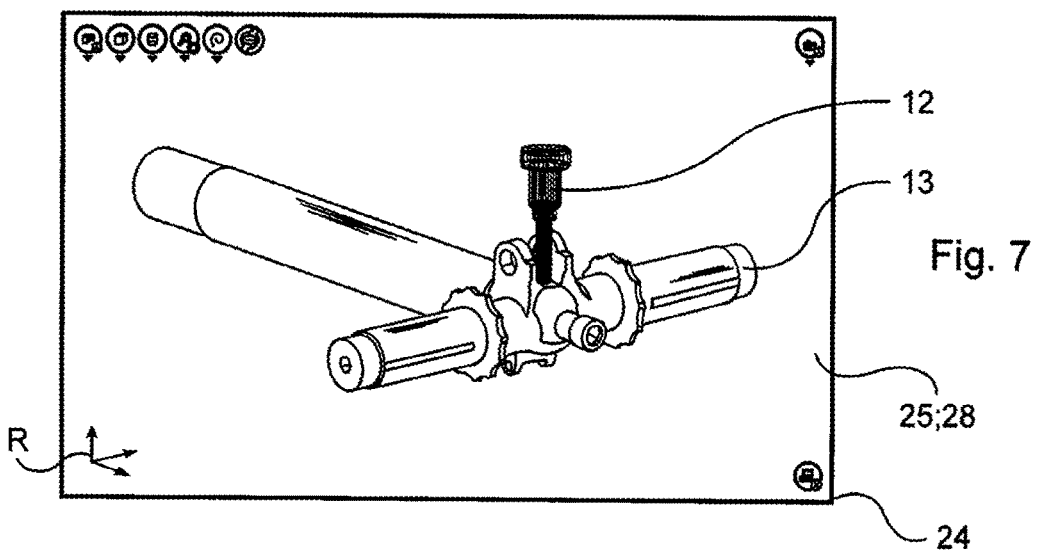
Figure 8:
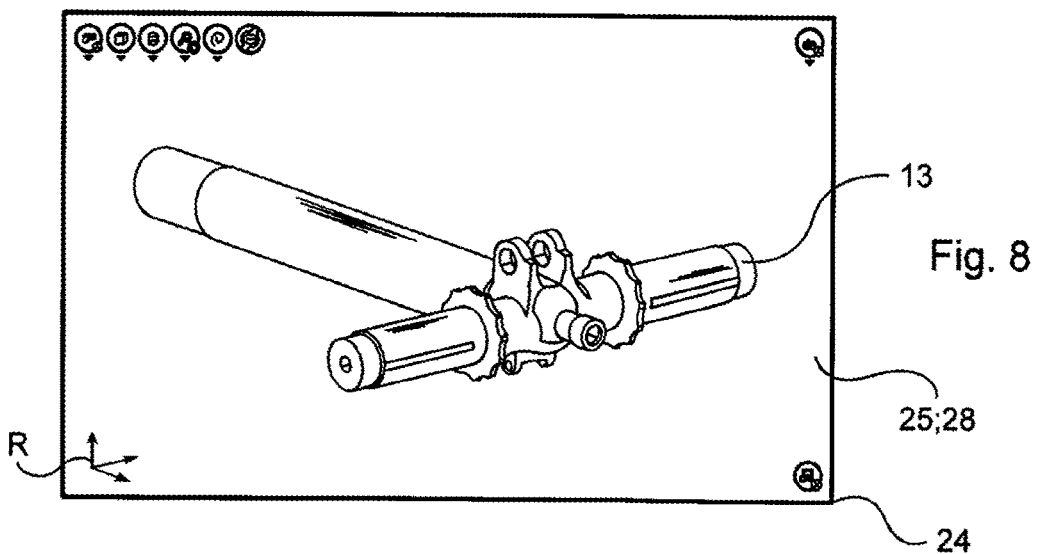

FIGS. 6, 7, and 8 shows images 25, 28 displayed by the display means 24 and all representative of the same machining instant t1, which may either be in the past (in which case the displayed image is a reconstituted image of past machining), or else a present instant of the current machining (in which case the image is either a simulated image, or a reconstituted image), or indeed a future instant (in which case the displayed image is necessarily a simulated image). In FIG. 6, there can be seen the tool 12, the blank 13, and the machine environment. In FIG. 7, there can be seen only the blank and the tool, without the machine environment. In FIG. 8, there can be seen only the blank, without the tool, this figure enabling the current shape of the blank to be seen clearly without the tool hiding a portion of the blank.

When the operator is of the opinion that it is possible, machining may be restarted and the physical controller 18 then takes up again the execution of the machining program at the restarting point determined in the machining program 19.

The machining program 19 may include instructions/routines for detecting the restarting point at which machining should begin again after an interruption. The physical controller then causes the real tool to move relative to the real blank from the disengagement point where the operator left the tool after disengaging it in manual control mode. For this movement from the disengagement point to the restarting point, the physical controller 18 may make use of the reconstituted image of the real blank and/or the simulated image of the real blank and/or the data representative of the shape of the real blank prior to the beginning of machining and/or data representative of the tool environment in order to determine the path that is to be followed by the real tool 12 in order to move to the restarting point.

It should be observed that restarting points are predetermined in the machining program so that the machining can begin again while limiting any risk of generating defects.

In summary, by means of the invention, the operator can view the current machining without needing to observe physically the real part or the real tool. This viewing is performed either on the basis of a reconstituted image 25 or on the basis of a simulated image 28.

The reconstituted image 25 is calculated while taking account of the real movements of the real tool and of the real shape of the tool by using the shape correction data 20. Its main advantage is to be close to the reality of the machining that has been performed, but its drawback is that it relates to a past state of the machining. This reconstituted image is used in the event of an alarm being generated, as in the implementation of FIG. 10, or in the event of manual control by the operator, as in the implementation of FIG. 11. It makes it possible to view a current position (with a small time offset) or a past position (for past machining for which the real machining data has been stored) of the real tool relative to the real blank and a state of the shape of the blank.

The simulated image 28 is not as close to the real shape of the machining as is the reconstituted image 25, but it gives an a priori view of the machining, either during machining, or indeed before the machining begins. In the implementation of FIG. 9, the simulated image 28 is put into phase with the machining instruction that is being carried out by the physical controller so that the operator knows with a few instructions in advance what is going to happen.

Ideally, the display means include a main display screen 24 and optionally secondary screens. Means for selecting these display means are arranged to select from among the reconstituted image 25 and the simulated image 28 the image that is to be displayed on the main screen. The reconstituted image is selected automatically when the operator is manually controlling the movement of the real tool, while the simulated image is selected automatically while the real tool is being moved relative to the real blank under the control of the physical controller 18 executing the machining program 19.

The present invention is described with reference to a real tool 12, however it also covers the situation in which a plurality of real tools are used by the machining tool for the purpose of machining one or more real parts at the same time. When there are a plurality of real tools, the display means take account of the individual shapes and paths of the real tools relative to the theoretical blank(s) in order to determine at least one image representative of the current shape of the blank(s) being machined.

Likewise, the invention also relates to a method of controlling a machining system in compliance with any of the implementations described above or claimed.

It should be observed that the invention may also provide a machining system including only the characteristics necessary for generating and using a simulated image, but without using the reconstituted image.

The invention claimed is:

1. A machining system (10) comprising a machining tool (11) comprising:
   at least one real tool (12) for machining a real part (13);
   a plurality of actuators (14) arranged to cause said at least one real tool (12) to move relative to a real blank (13) for machining in order to form the real part (13);
   a plurality of sensors (15) for generating positioning data (16) representative of a current position of the real tool (12) relative to a real machine reference frame (R);
   a memory (17) storing shape correction data (20) for the real tool (12); and
   a physical controller (18) arranged to execute a machining program (19) and to control the actuators (14) in compliance with instructions contained in the machining program (19) and as a function of at least some of the shape correction data (20) for the real tool (12), so as to move said at least one real tool (12) in the real machine reference frame (R) relative to the real blank (13) in such a manner as to machine the real blank (13) in order to form the real part (13);
   the system being characterized in that operator information transmitter (21) are connected to the physical controller (18) in order to receive data (22) representative:
   of the current position of the real tool (12) in the real reference frame (R); and
   of the current position of the real blank (13) in the real reference frame (R);
   the operator information transmitter (21) comprising an image display (24) and memory means (23) for storing a succession of current positions of the real tool (12) in the real reference frame (R), the image display (24) being arranged to generate and display at least one reconstituted image (25) that is reconstituted on the basis of said data (22) representative of the positions of the real tool (12) and of the real blank (13) in the real reference frame (R) and on the basis of a theoretical shape for the real tool (12) as determined at least from the shape correction data (20) of the tool (12) also used by the physical controller (18) during the execution of said machining program (19), the reconstituted image (25) being representative:
   of the shape at a given instant of the real blank (13) being machined; and
   of the position at the given instant of the real tool (12) relative to the real blank (13).

2. The machining system (10) according to claim 1, wherein the machining system (10) further comprises:
   a virtual controller (26) connected to said physical controller (18) by communications means (27) between the controllers (18, 26), the virtual controller (26) being arranged to simulate the operation of the physical controller (18) executing said machining program (19), the simulation taking account of said machining program (19) and of the shape correction data (20) for the tool that is also used by the physical controller (18) while the physical controller (18) is executing said machining program (19); and
   the operator information transmitter (21) are also connected to the virtual controller (26) and they are arranged to transmit information to the operator, which information comes from the simulation by the virtual controller (26) of the operation of the physical controller, said image display (24) also being arranged to use the information coming from the simulation to generate a "simulated" image (28) that is distinct from the reconstituted image (25), the simulated image (28) likewise being representative:
   of the shape at a given instant of the real blank (13) being machined; and
   of the position at the given instant of the real tool (12) relative to the real blank (13).

3. The machining system according to claim 1, wherein the image display (24) also is arranged to generate the reconstituted image (25) by making use of:
   a theoretical shape for the blank before machining, the theoretical shape being representative of the real shape of the real blank (13) before machining;
   a theoretical shape (F0) for the real tool (12) determined at least on the basis of shape correction data (20) for the tool that is also used by the physical controller (18) during its execution of said machining program (19), the theoretical shape for the real tool (12) being representative at least in part of the real shape of the real tool (12); and
   a reconstituted theoretical path (Tj) representative of the movement of the real tool (12) relative to the real blank (13), the reconstituted theoretical path (Tj) being calculated using said succession of current positions of the real tool (12) in the real reference frame (R) as determined from at least some of said positioning data generated by the plurality of sensors (15).

4. The machining system (10) according to claim 3, wherein the image display (24) is arranged to generate said reconstituted image (25) representative of the shape at a given instant of the real blank (13):
   by determining zones (Zi) of the theoretical shape (F0) for the blank prior to machining that, up to this given instant (t1) of the machining, have been found to lie on the reconstituted theoretical path (Tj) for the movement of the real tool (12), these zones (Zi) being referred to as intersection zones (Zi); and
   by subtracting all of these intersection zones (Zi) from the theoretical shape (F0) of the blank prior to machining, so that the reconstituted image (25) as generated in this way is representative of the shape of the real blank (13) at the given instant (t1) of the machining.

5. The machining system according to claim 1, wherein the system (10) enables the user to select said given instant (t1) of the real machining for which the user desires to obtain a reconstituted image (25) representative of the machining at said selected given instant in the past.

6. The machining system according to claim 1, wherein the image display (24) is arranged to generate a visual animation representative of at least a portion of the machining, with said displayed image (25, 28) being extracted from the animation.

7. The machining system according to claim 1, wherein the system (10) includes a viewpoint selector for selecting a viewpoint used for generating the displayed image (25, 28), the viewpoint selector also being arranged to select the type of representation that is to be used for generating the displayed image from among:
   a perspective representation; and/or a section representation on a section plane selected by the operator; and/or a representation comprising an image of the real tool in position relative to the real blank (13) being machined; and/or a representation comprising an image of the real tool positioned relative to the real blank being machined and relative to a machine environment around the tool and the blank.

8. The machining system according to claim 2, wherein the operator information transmitter (21) include phase adjustor for adjusting the phase of the displayed simulated image (28) as a function of the machining program instruction (19) that is being executed by the physical controller (18), the phase adjustor being arranged so that the displayed simulated image (28) is representative of a machining operation on the real blank (13) that ought to be performed by the real tool (12) in response to the physical controller (18) executing an instruction that ought to be executed in the future by the physical controller (18).

9. The machining system according to claim 1, further including an alarm for generating an alarm in the event:

of the reconstituted path (Tj) of the real tool (12) penetrating into a predetermined limit zone extending around a virtual surface representative of the real part that it is desired to obtain at the end of machining; and/or of a machining incident being detected such as detecting breakage of the real tool (12), detecting abnormal vibration of an element of the machining system (10), detecting movement of the real tool (12) outside a predetermined space authorized for presence of the real tool, and detecting opening of a safety gate of the machining tool; and/or of detecting an order to stop machining issued by the operator acting on a manual control.

10. The machining system according to claim 9, wherein, in the absence of an alarm being generated while machining is taking place, the image display (24) being operative to display the simulated image (28) at a phase set by using said phase adjustor for phasing the displayed simulated image as a function of the instruction (19) of the machining program that is being executed by the physical controller (18).

11. The machining system according to claim 10, wherein the operator information transmitter (21) are arranged to display the reconstituted image (25) as soon as an alarm is generated while machining is taking place, and to authorize the operator to pass to a manual control mode in which the operator controls the actuators (14) to move the real tool (12) relative to the real blank (13) using a manual control such as a control joystick and/or control key, the displayed reconstituted image (25) being representative:

of the shape of the real blank (13) being machined at the instant when the operator controls movement of the real tool manually relative to the real blank; and of the position of the real tool relative to the real blank at that instant.

12. The machining system according to claim 2, wherein the image display (24) is also arranged to generate the simulated image (28) by making use of:

a theoretical shape (F0) for the blank before machining, the theoretical shape (F0) being representative of the real shape of the real blank before machining;

a theoretical shape for the real tool (12) determined at least on the basis of shape correction data (20) for the tool that is also used by the physical controller (18) during its execution of said machining program (19), the theoretical shape (F0) for the real tool (12) being representative at least in part of the real shape of the real tool (12); and a simulated theoretical path (Tj) representative of the movement of the real tool (12) relative to the real blank (13) as if the program (19) were executed by the physical controller (18), this simulated theoretical path (18) being calculated by the virtual controller (26) executing said machining program (19) using said shape correction data (20) for the real tool.

* * * * *